US010652173B2

(12) United States Patent
Fernandez et al.

(10) Patent No.: US 10,652,173 B2
(45) Date of Patent: May 12, 2020

(54) METHOD FOR ESTABLISHING BI-DIRECTIONAL MESSAGING COMMUNICATIONS WITH WIRELESS DEVICES AND WITH REMOTE LOCATIONS OVER A NETWORK

(71) Applicants: Jorge Fernandez, Markham (CA); Michael Berkeley Paul, Toronto (CA)

(72) Inventors: Jorge Fernandez, Markham (CA); Michael Berkeley Paul, Toronto (CA)

(73) Assignee: CANAMEX CORPORATION, Markham (CA)

( * ) Notice: Subject to any disclaimer, the term of this patent is extended or adjusted under 35 U.S.C. 154(b) by 874 days.

(21) Appl. No.: 13/854,761

(22) Filed: Apr. 1, 2013

(65) Prior Publication Data

US 2013/0232209 A1  Sep. 5, 2013

Related U.S. Application Data

(63) Continuation of application No. 12/463,733, filed on May 11, 2009, now abandoned.
(Continued)

(51) Int. Cl.
*G06F 21/00* (2013.01)
*H04L 29/06* (2006.01)
(Continued)

(52) U.S. Cl.
CPC .......... *H04L 51/04* (2013.01); *H04L 63/0428* (2013.01); *H04L 63/08* (2013.01);
(Continued)

(58) Field of Classification Search
CPC .. H04W 4/12; H04W 8/245; H04L 29/12009; H04L 29/12047; H04L 61/15; H04L 9/32;
(Continued)

(56) References Cited

U.S. PATENT DOCUMENTS 6,131,120 A * 10/2000 Reid ............................. 709/225
6,983,312 B1 * 1/2006 O'Neil ......................... 709/217
(Continued)

FOREIGN PATENT DOCUMENTS

EP       2930882 A1 * 10/2015  ......... H04L 12/1827

OTHER PUBLICATIONS

Conti, Mauro, Hasani, Arbnor, Crispo, Bruno; "Virtual private social networks and a facebook implementation"; ACM Transactions on the Web (TWEB), vol. 7, Issue 3, Sep. 2013, pp. 1-31 (Year: 2013).*

*Primary Examiner* — Kendall Dolly
*Assistant Examiner* — Courtney D Fields

(57) ABSTRACT

A method, server, device and computer readable medium for facilitating communication between users permitted to access a messaging server is provided. The messaging server comprises a user database, a processor and memory. The user database is configured to store user information for the users and at least one name directory. The name directory includes a list of users permitted to communicate with each other. The memory has stored thereon instructions which, when executed by the processor, cause the messaging server to transmit the name directory to the users listed therein at predefined times.

22 Claims, 8 Drawing Sheets

Related U.S. Application Data

(60) Provisional application No. 61/071,717, filed on May 14, 2008.

(51) Int. Cl.
 *H04L 12/58* (2006.01)
 *H04L 12/18* (2006.01)

(52) U.S. Cl.
 CPC .............. *H04L 63/16* (2013.01); *H04L 69/14* (2013.01); *H04L 69/16* (2013.01); *H04L 69/163* (2013.01)

(58) Field of Classification Search
 CPC ...... H04L 63/08; H04L 67/42; H04M 3/4931; Y10S 707/99939; G06F 21/31; G06F 17/30011; G06F 17/30528; G06F 17/3028; Y02B 60/188
 USPC ......................................................... 713/151
 See application file for complete search history.

(56) References Cited

U.S. PATENT DOCUMENTS

| | | | | |
|---|---|---|---|---|
| 8,474,628 | B1* | 7/2013 | Appelman | H04L 51/04 209/206 |
| 8,738,639 | B1* | 5/2014 | Zafar et al. | 707/752 |
| 2003/0048892 | A1* | 3/2003 | Murai | 379/242 |
| 2003/0060689 | A1* | 3/2003 | Kohls et al. | 600/300 |
| 2003/0131113 | A1* | 7/2003 | Reeves et al. | 709/229 |
| 2003/0217095 | A1* | 11/2003 | Kitada et al. | 709/201 |
| 2004/0148356 | A1* | 7/2004 | Bishop, Jr. | H04L 51/38 709/206 |
| 2005/0129193 | A1* | 6/2005 | Watts et al. | 379/88.17 |
| 2006/0173781 | A1* | 8/2006 | Donner | G06Q 10/02 705/50 |
| 2008/0046442 | A1* | 2/2008 | Grason | G06F 17/3089 |
| 2008/0279534 | A1* | 11/2008 | Buttars | 386/94 |
| 2008/0313731 | A1* | 12/2008 | Iftimie | G06F 21/31 726/18 |
| 2009/0110177 | A1* | 4/2009 | Sivakumar | 379/218.01 |

* cited by examiner

METHOD FOR ESTABLISHING BI-DIRECTIONAL MESSAGING COMMUNICATIONS WITH WIRELESS DEVICES AND WITH REMOTE LOCATIONS OVER A NETWORK

The present invention relates generally to messaging networks, and more particularly to a messaging server configured to establish a bi-directional communications session in a messaging network. This application is a continuation of U.S. patent application Ser. No. 12/463,733 filed May 11, 2009.

FIELD OF THE INVENTION

Background of the Invention

In a given day, hundreds of millions of electronic messages are generated and sent via communications networks, such as intranets, extranets, local area networks (LANs), wide area networks (WANs), the Internet, both by wire and wirelessly. Various messaging systems, involving respective protocols, communications devices and routing technologies support the delivery of messages in various manners, and are each used extensively throughout the World for both personal and business use.

Of the numerous messaging systems available to both individuals and businesses today, several have inherent limitations when considered in the context of their use in business or other environments requiring high reliability. For example, many messaging systems suffer from poor delivery reliability, high delivery delays, poor or nonexistent security, problems with spam incursion, and poor or unavailable messaging activity logging. Each of these problems is a barrier to the messaging systems' full and effective use in such business or other environments.

For example, the messaging system known as SMTP (Simple Mail Transfer Protocol) e-mail, or simply "e-mail", is prolific and easy to set up, but can suffer from significant delivery delays, whereby a text-based e-mail message can take from one minute to several hours to be delivered from its source to the destination. The reasons for the delays relate to how the SMTP protocol handles messaging and how it has been designed to provide a somewhat resource-inexpensive, though accordingly unreliable, messaging system. According to the SMTP protocol, one or more recipients of a message are specified, and in most cases verified to exist, along with the message text and optional file attachments. The message is then transferred from a client to a remote server using a procedure of queries and responses between the client and remote server. An SMTP client is an e-mail application running on a network device from which the e-mail message originated. Mail Transport Agents (MTAs)—applications running as message relays on network devices—are also known in respect of the remote server as SMTP clients.

An e-mail client is configured prior to use with the domain name of an outgoing mail SMTP server with which it is to communicate. A relaying server typically determines which SMTP server to which a message should be relayed by automatically looking up a Mail Exchange (MX) Domain Name System (DNS) record for each recipient's domain name. It will be understood that the domain name in a recipient's e-mail address is the part of the email address that follows the "@" sign.

It will also be understood that SMTP is inherently a "push" protocol. That is, the protocol does not inherently enable one to "pull" messages from a remote server on demand. As such, in order to receive messages, an e-mail client uses a different protocol, such as Post Office Protocol version 3 (POP3) or Internet Mail Access Protocol (IMAP), to poll for messages either manually or at programmable intervals. As would be known, one SMTP server can request another SMTP server to forward messages for delivery, according to the Extended Turn (ETRN) protocol.

An alternative to standard SMTP e-mail is push e-mail, whereby new mail arriving at an SMTP server is instantly pushed to certain capable client devices (such as certain smartphones) as it is received at the SMTP server. With push e-mail, delivery delays are also common, primarily because of the path of delivery undertaken by the e-mail message. For example, e-mails typically travel to the e-mail server via the Internet. Furthermore, push e-mail is implemented only by certain cellular device manufacturers, and therefore is only available on certain devices.

Another messaging system employs the Short Message Service (SMS) protocol to enable the interchange of short text messages between mobile telephone devices. The SMS messaging system is also unreliable because message delivery is handled merely on a "best effort" basis. Users may choose to request delivery reports depending upon what their mobile telephone service provider is able to offer. However, because the design of the SMS messaging system prevents access by a service provider to the underlying protocol governing messaging particulars, the service provider is unable to provide delivery guarantees.

In its early days of implementation, SMS was thought by developers to be useful primarily as an alerting mechanism by which users could be informed that e-mails were waiting to be read. However, SMS has gained significance more recently as the technology underpinning the practice most commonly known as "text messaging".

In order to describe why service providers are unable to offer delivery guarantees, it is useful to explore the SMS protocol in further detail. According to the SMS protocol, a text message created on a mobile device is sent to a Short Message Service Centre (SMSC), which functions as a store-and-forward mechanism. The SMSC attempts to transmit the message to its recipient and, if a recipient is not reachable, the SMSC queues the message and tries again at a later time. A "forward and forget" option may be provided by the SMSC, according to which each transmission is tried only one time, regardless of whether the transmission is ultimately successful. SMS supports both Mobile Terminated (MT) operations (i.e. messages sent to a mobile handset) and Mobile Originating (MO) operations (messages sent from a mobile handset).

SMS gateway providers facilitate the handling of SMS traffic between businesses and mobile subscribers, and are mainly responsible for the mission-critical messages, SMS for enterprises, content delivery and entertainment services involving SMS, such as voting for television programs. Considering SMS messaging performance and cost, as well as the level of messaging services, SMS gateway providers can be classified as aggregators, or SS7 providers.

The aggregator model is based on multiple agreements with mobile carriers to exchange 2-way SMS traffic into and out of the operator's SMS platform (Short Message Service Centre—SMS-C), also known as local termination model. Aggregators lack direct access into the SS7 protocol, which is the protocol where the SMS messages are exchanged. Unfortunately, the service providers have no visibility and control over the message delivery, and as such are unable to offer any delivery guarantees. SMS messages are delivered in the operator's SMS-C, but not to the subscriber's mobile device.

Multimedia Messaging Service (MMS) is a standard for telephone messaging systems that enables the sending of messages that include multimedia objects (images, audio, video, rich text). MMS is mainly deployed in cellular networks along with other messaging systems like SMS (of which MMS is an extension), Mobile Instant Messaging (described below) and Mobile E-mail. MMS allows the sending and receiving of multimedia messages such as graphics, video and audio clips. It has been designed to work with mobile packet data services such as GPRS and 1x/EVDO.

MMS-enabled mobile phones enable subscribers to compose and send messages with one or more multimedia parts. Such multimedia parts may include text, images, audio and video. The various content types should be made to conform to the MMS standard, such that an MPEG-4 video in AVI format sent from one mobile device is able to be interpreted by the receiving party at a receiving mobile device. To enable interoperability of mobile devices where MMS is concerned, the mobile devices should follow the relevant standards defined by the Open Mobile Alliance (OMA). Mobile phones with built-in or attached cameras, and/or with built-in MP3 players are very likely to also have an MMS messaging client software program that provides the interface for the mobile phone users to compose, address, send, receive, and view MMS messages.

Unfortunately, even if the respective mobile devices of a sender and receiver of a given MMS message are MMS compatible, the multimedia content created on the sender's mobile device may itself be incompatible with the recipient mobile device. According to the MMS, a recipient MMSC is responsible for adapting content (by image resizing, audio codec transcoding, and so forth), if this feature is in fact enabled by the mobile network operator. As such, only when such content adaptation is supported by a network operator do its subscribers enjoy content-level compatibility with a larger network of MMS users than would otherwise necessarily be available.

It is known that current MMS specifications do not inherently include provisions for distribution lists or other methods by which large numbers of recipients can conveniently be addressed. Such functionality is useful to content providers, known as Value Added Service Providers (VASPs) in the language of the 3GPP (3rd Generation Partnership Project). Currently, most SMSC vendors have adopted FTP (File Transfer Protocol) as an ad-hoc method by which large distribution lists may be transferred to the SMSC for later use in bulk-messaging. Accordingly, it is expected that the MMSC vendors will follow suit.

In addition to the above, peer-to-peer MMS messaging involves several over-the-air transactions that become unwieldy when sending messages to large numbers of subscribers, as is typically the case for VASPs. For example, when one MMS message is submitted it is possible to receive a delivery report and read-reply report for each and every recipient. When the MMS message is sent to a very large number of recipients, the reports become unwieldy to handle both in the channel and at the receiving end. While future MMS specification work is likely to optimize and reduce the transactional overhead required for bulk-messaging, this currently has not been adequately addressed.

Unlike SMS, MMS requires a number of handset parameters to be set. Poor handset configuration is often blamed as the first point of failure for many users. Service settings are sometimes preconfigured on the handset, but mobile operators are now looking at new device management technologies as a means of delivering the necessary settings for data services (MMS, WAP, etc.) via over-the-air programming (OTA).

Few mobile network operators offer direct connectivity to their MMSCs for content providers. This has resulted in many content providers using WAP push (Wireless Access Protocol push) as the only method by which to deliver 'rich content' to mobile handsets. WAP push enables 'rich content' to be delivered to a handset by specifying the URL (via binary SMS) of a pre-compiled MMS message, hosted on a content provider's web server. One primary downside of WAP push is that from a billing perspective this content is typically billed at data transfer rates, rather than at MMS messaging rates. As will be understood, the charges can be significant and result in 'bill shock' for consumers.

Although the standard does not specify a maximum size for a message, 300 kB is the current recommended size used by networks due to various limitations with the WAP gateway.

MMS is distinct from Enhanced Messaging Service (EMS), which is simply the Short Message Service (SMS) having additional message payload capabilities. For example, EMS messages may have text formatting (such as bold or color), animations, pictures, icons, sound effects, and ring tones.

Other messaging technologies such as instant messaging (IM) and chat facilitate near real-time text based communication between two or more logged-in participants over a network. IM and chat are distinct from other technologies such as e-mail due to the perceived real-time effect of the messaging. For example, chat is perceived to happen in real-time before your eyes. For this reason, some people consider communication via IM to be less intrusive than communication via phone. There are systems that permit the sending of messages to users who are not logged in (offline messages), thus enabling IM to be used in much the same manner as is e-mail.

Because information is transmitted quickly, Instant Messaging enables near-instantaneous communication between a numbers of parties simultaneously, enabling real-time conversations. In addition, some IM systems support transmission of data from a webcam and/or a microphone during such conversations, making such IM systems very popular with users. IM provides additional features including immediate acknowledgments, group chatting, conference services (including voice and video), conversation logging and file transfer.

With IM, it is possible to save a conversation for later reference. IM messages are typically logged in a local message history, similar to e-mail applications' in-boxes and folders. IM also facilitates the rapid exchange of information such as URLs or document snippets, which when otherwise communicated by telephone can be unwieldy.

Mobile Instant Messaging (MIM) is a presence enabled messaging service that aims to transpose the desktop messaging experience to the usage scenario of being on the move. While several of the core ideas of the desktop experience apply to a connected mobile device, others do not. For example, users typically look only at their mobile device's screen, and presence status changes might occur under different circumstances than might occur at the desktop. Furthermore, several functional limits exist based on the fact that the vast majority of mobile communication devices are chosen by their users to fit into the palm of their hand. For example, some of the form factor and mobility related aspects need to be taken into account in order to create a really adequate, powerful and yet convenient mobile experience. These aspects include radio bandwidth, memory size, availability of media formats, keypad based input, screen output, CPU performance and battery power.

For corporate use, encryption and conversation archiving are usually regarded as important features due to security concerns. Sometimes the use of different operating systems in organizations calls for the use of software that supports more than one platform. For example many software companies use Windows XP™ in administration departments, but have software developers who develop using Linux™.

Similar to other technologies, the use of Instant Messaging has been driven primarily by individual employees using consumer-directed software at work, rather than by formal mandate or provisioning by corporate information technology departments. Tens of millions of the consumer IM accounts in use are now being used for business purposes by employees of companies and other organizations.

There are risks and liabilities associated with Instant Messaging. For example, employees may misuse the instant messaging client to communicate on a personal level with friends and family. This is poor use of a business's time and resources, as the employee's effectiveness will most certainly decrease due to the added distractions. As would be understood, however, use of the messaging system can be hard to control. It is currently very difficult for a corporation to place constraints on the types of messages that are sent, and to whom they are sent. There is also the risk of employees releasing confidential information such as project details, either inadvertently or otherwise, by way of instant messages to outside sources.

While implementing an IM policy for employees that addresses the above issues and others can be useful, such an IM policy is difficult to enforce on a practical level. In addition, message archiving should be considered for tracking IM activity and maintaining information security.

Other risks arise when using instant messaging within an organization, such as security risks (e.g. IM used to infect computers with spyware, viruses, Trojans, worms), compliance risks, inappropriate use, and intellectual property leakage. For example, Crackers (malicious "hacker" or black hat hacker) have consistently used IM networks to make "phishing" attempts, and to deliver "poison URL's" and virus-laden file attachments. According to the IM Security Center, there were 1100 discrete attacks between 2004-2007.

Such hackers primarily use one of two methods for delivering malicious code through IM. These are a) the delivery of virus, Trojan, or spyware within an infected file, and b) the use of "socially engineered" text with a web address that entices the recipient to click on a URL that connects him or her to a website that then downloads malicious code. Viruses, worms, and Trojans typically propagate by sending themselves rapidly through the infected user's buddy list.

In addition to the malicious code threat, the use of instant messaging at work also creates a risk of non-compliance to laws and regulations governing the use of electronic communications in businesses. In the United States alone there are an extremely large number of laws, rules and regulations that relate to electronic messaging and records retention. The more well-known of these include the Sarbanes-Oxley Act, HIPAA, and SEC 17a-3. Recent changes to the United States Federal Rules of Civil Procedure, effective Dec. 1, 2006, created a new category for electronic records which can be requested during discovery proceedings. Other countries regulate the use of electronic messaging and electronic records retention in similar fashion to the United States. The most common regulations related to IM at work involve the need to produce archived business communications to satisfy government or judicial requests under law. Many instant messaging communications fall into the category of business communications that must be archived and retrievable.

Given the above, it is clear that organizations of all types must protect themselves from the liability of their employees' inappropriate use of IM, and must take steps to archive the messages. The informal, immediate, and ostensibly anonymous nature of instant messaging unfortunately also makes it a good candidate for abuse in the workplace. In most countries, corporations have a legal responsibility to ensure harassment-free work environment for employees. The use of corporate-owned computers, networks, and software to harass an individual or spread inappropriate jokes or language creates a liability for not only the offender but also the employer. A survey by IM archiving and security provider Akonix Systems, Inc. in March 2007 showed that 31% of respondents had been harassed through IM at work. Companies now include instant messaging as an integral component of their policies on appropriate use of the World Wide Web, e-mail, and other corporate assets.

While the several messaging systems described above work generally well for their respective intended purposes, each suffer from one or more limitations that render them generally unsuitable for use in business and mission-critical environments. It is therefore an object of the present invention to provide a method for establishing a bi-directional communications session in a communications network that mitigates or overcomes one or more of the limitations described above.

SUMMARY OF THE INVENTION

In accordance with one aspect, there is provided a messaging server configured to facilitate communication between users permitted to access the messaging server, the messaging server comprising: a user database configured to store: user information for the users; and at least one name directory including a list of users permitted to communicate with each other; a processor; and memory having stored thereon instructions which when executed by the processor cause the messaging server to transmit the name directory to the users listed therein at predefined times.

According to another aspect there is provided a communication device configure to facilitate communication via a messaging server with users of the messaging server, the communication device comprising: a processor; and memory having stored thereon instructions which when executed by the processor cause the communication device to request a connection with the messaging server; transmit user information for verifying a user of the communication device; and receive at least one name directory including a list of users with which the user of the device is permitted to communicate.

According to yet another aspect there is provided a messaging server configured to facilitate communication between users permitted to access the messaging server, the messaging server comprising: a user database configured to store user information for the users; a processor; and memory having stored thereon instructions which when executed by the processor cause the messaging server to: receive a message from a first one of the users to transmit to a second one of the users; determine at least one recipient device associated with the second one of the users; transmit the message to the at least one recipient device; and communicate to the first one of the users that the message has been read at the at least one recipient device.

The method, mobile device, server, and computer readable medium described herein provide persistent communication sessions between devices and a server that support point-to-point bidirectional messaging between devices and the server and from device to device via the server. The method described herein is particularly advantageous for rapid, reliable and secure messaging between various devices that are connected to the server. Such devices may include mobile devices such as Smartphones, PDAs (Personal Digital Assistants) or cellular telephones, personal computing devices, and/or any device that is capable of sending and/or receiving data over a transport layer connection with the server. Because of the establishment of a transport layer connection with the server, messages passed from or to mobile devices through the communications sessions are not dependent upon the type of telephone company carrier or the channel access method (CDMA, GSM etc.), and thus may be more universally employed to the advantage of organizations requiring extensive and reliable communications between their people.

The bi-directional communications protocol described herein provides highly reliable delivery of critical text messages within seconds, and files can be sent to mobile devices without encountering transmission format limitations such as those imposed by the disparate communications providers. According to certain embodiments, data is encrypted in a manner suitable for meeting government and other security regulations. Furthermore, embodiments described herein, particularly those including steps for encrypting data, make it exceedingly difficult for hackers and electronic infections, or spam proliferators to make denial of service attacks or data grabs of the data being sent between devices. Furthermore, because the bidirectional communications established according to the method described herein sits atop the transport layer, the above advantages are provided without the need for additional wireless infrastructure.

Embodiments of the invention described herein do not employ the SMTP or SMS protocols. Rather, a transport layer connection (preferably a TCP/IP connection) provides the benefits of available network ubiquity and flexibility, while the point-to-point bidirectional messaging protocol described herein imparts the messaging reliability, delivery speed, security, and bidirectionality. More particularly, use of TCP/IP in combination with the bidirectional messaging protocol adapts the public and ubiquitous TCP/IP intelligent communications networks that are already in place throughout the World so as to make them suitable for fast, reliable, and secure messaging. Furthermore, there is no need for Aggregators.

According to an embodiment, a confirmation is returned to a sender device when the recipient device receives a message. According to an embodiment, the sender device receives confirmation that a sent message has in fact been read, along with the date and time that reading occurred. According to an embodiment, the sender device may receive data specifying the date and time that the recipient has viewed each attachment to the message that has been sent to the recipient device by the sender. According to an embodiment, if a message is not confirmed to have been read, the message is automatically sent to a pre-specified alternative recipient.

According to an embodiment, the server provides for archiving of the messages, attachments, and related data. A log shows who it was that sent the message, the date and time, the content of the message and any attachment(s) to the message.

BRIEF DESCRIPTION OF THE DRAWINGS

Embodiments will now be described more fully with reference to the accompanying drawings in which.

DETAILED DESCRIPTION OF THE EMBODIMENTS

Figure 1:
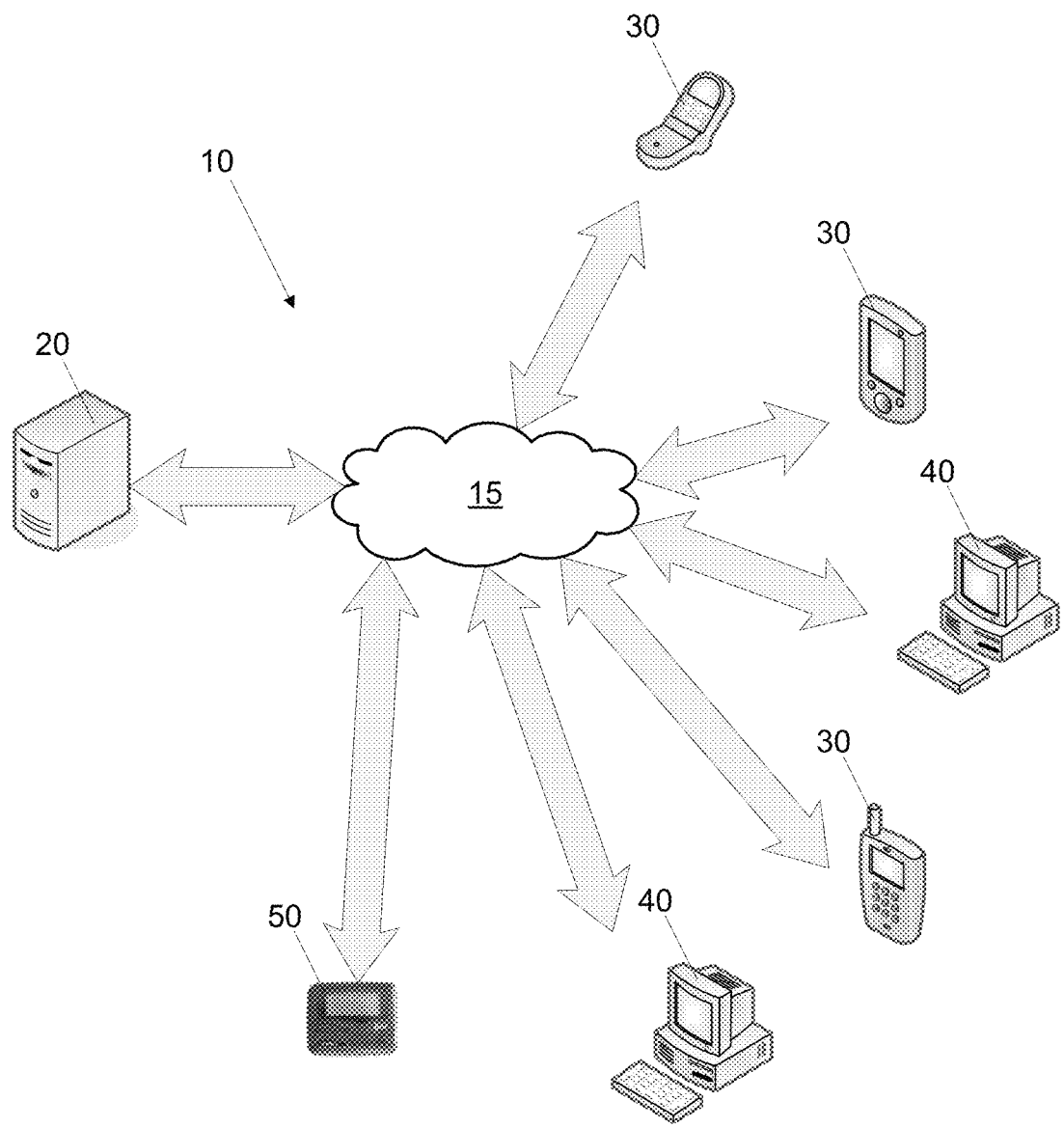
FIG. 1 is a communications network.

Turning to FIG. 1, a communications network is shown and generally referred to using reference numeral 10. Communications network 10 includes a messaging server 20, and several communications devices including mobile devices 30 in the form of a cell phone, a smartphone, and a PDA, remote computers 40 (such as desktops, laptops, etc.), and one or more pagers 50. Communications network 10 may also include several other devices as will be described that are also capable of communicating with one another either directly or indirectly over a TCP/IP intelligent network 15.

The server 20 has a processor that is under control of software that configures server 20 as a messaging engine. From this point in the description, references to server 20 is intended for the sake of simplicity of description to cover server 20 as an operational unit, including the various server applications and other applications controlling the processor on server 20.

Server 20 is capable of receiving messages sent via Web browsers from a respective computer 40 via the XML (eXtensible Markup Language) protocol over an Internet or Intranet connection. In one embodiment, a remote computer 40 through its respective Web browser may provide a user with access to a browser-based Web messaging application running on the server 20.

WebPager™, an application developed by Canamex Communications Corporation of Markham, Ontario, Canada, is such a Web messaging application. WebPager™ interfaces with services provided by Microsoft's Internet Information Server (IIS), and provides Web forms accessible by remote Web browsers (for example a Web browser running on a personal computer 40) enabling users to send messages through their Web browsers to server 20.

Figure 2:
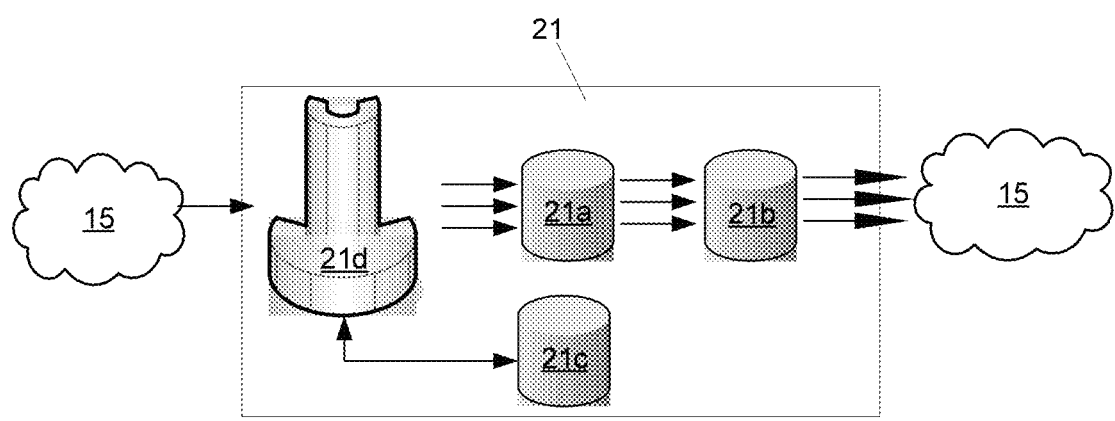
FIG. 2 is a schematic diagram showing the components of one embodiment of the server shown in FIG. 1.

In one embodiment of the invention, a messaging server 21 such as Canamex's PageRouter™ is also installed on server 20. PageRouter™ interfaces with WebPager™ to ultimately enable a user to send messages from remote computers 40 to wireless devices elsewhere via the Web browser on the remote computer 40 without having installed any specialized software on the remote computer 40 for receiving messages for transmitting to one or more pagers 50*a* (see FIG. 5). FIG. 2 is a schematic diagram showing the components of the PageRouter™ server 21 and its relationship to the TCP/IP intelligent network 15. The PageRouter™ server 21 comprises a log database 21*a*, a routing database 21*b*, a user database 21*c*, and a routing engine 21*d*.

In the event that paging is required in a particular location, local paging software such as Canamex's DigiPager Link™ client software 40*a* is installed at a corresponding remote computer 40. The local paging software 40*a* running on the remote computer 40 interfaces with the PageRouter™ application running on the server 20 to receive messages that have been sent through server 20 from other remote computers 40 (via Web browsers as described above) and from mobile devices 30 (as will be described), or from server 20 itself. The DigiPager Link™ application 40*a* establishes its own persistent, bi-directional communications session with the PageRouter™ server 20.

Figure 6:
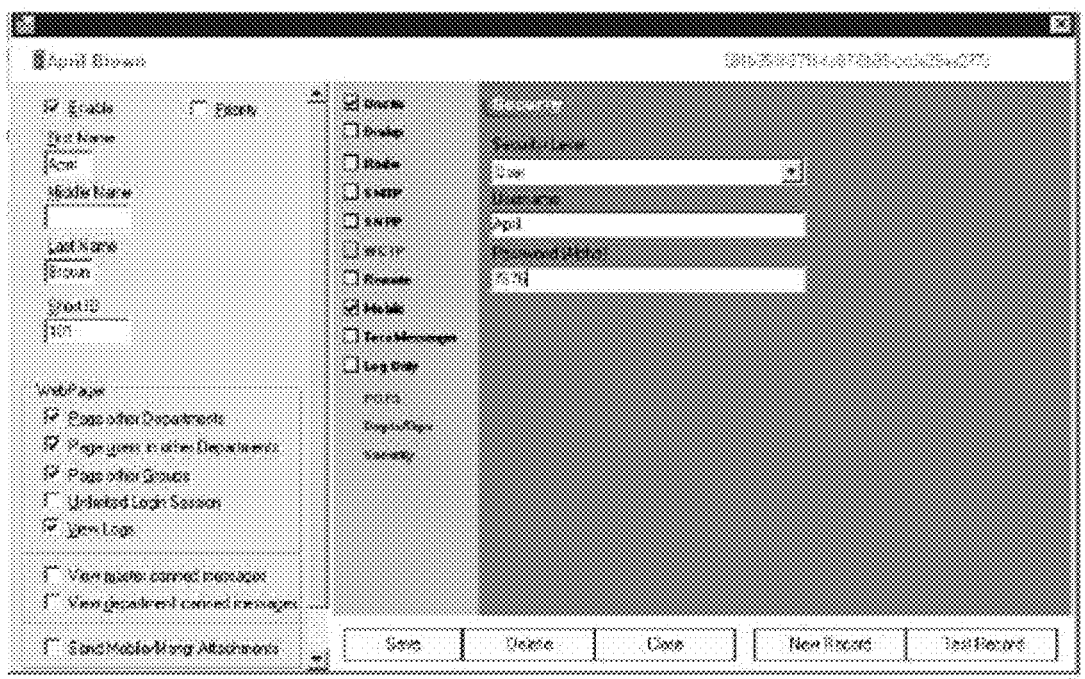
FIG. 6 is a screenshot showing a first screen of an administrator's interface to the server.

During setup of PageRouter™, an administrator programs, through a user interface such as that shown in FIG. 6, a User Database with the details of users having mobile devices, including their names and cellular telephone numbers or PDA ID, pagers and also assigns them a username and password.

Other optional features are selected by the administrator for each user. For example, the administrator may grant permission to a user to view other users outside of their particular department, or to view other groups and to view messaging logs through Web access to the WebPager™ application.

Server 20 stores data relating to each message in a Message Log database either on server 20 or on a separate, network-connected computer (not shown). Such data includes the date and time of message transmission, the destination pager ID or phone number, origin, sender name and the text of each message.

The Administrator also pre-programs the destination of messages for each user. The Routing Database stores this information available to the server when processing messages.

Canamex's PageRouter™ is capable of sending notifications of message file attachment(s) to wireless devices such as onsite and commercial pagers, smartphones, cellular telephones and to email addresses. In order to view the file attachments themselves, the recipients of such file attachment notifications could, using a remote computer 40, login to WebPager™ on server 20 in order to download/view one or more of the attachments. PageRouter™ is of course capable of attaching files to email messages, as is known in other systems. This is done by a user by logging into WebPager™, selecting a recipient name, typing a message and attaching a file. The message is then received by the wireless device. If the wireless device is a smartphone, then the recipient can see the attachment notification and download the attachment to the smartphone. If the wireless device is a pager, the recipient upon receiving the page can him/herself login to WebPager™ to access the attachments.

Preferably, proprietary messaging application software is installed in each mobile device 30 that enables each mobile device 30 to send messages to server 20 over a persistent, bidirectional communications session. The messaging application software is downloadable from the service Web site via the Web browser that runs on the mobile device. Installation of the messaging application software is conducted manually by the user, or may be made to be automatic. In some cases, mobile devices may be delivered by commercial carriers with the messaging application software already installed. In one embodiment, the propriety messaging application software for local installation in a mobile device is Canamex's TeraMessage™ application, which sends messages to and from the mobile device 30 using Canamex's TeraMessage Protocol (TMP), as will be described.

The user of the mobile device must contract data services from the telephone company so as to be able to establish a TCP/IP connection between the server and the mobile device upon which the proprietary messaging application is being run. This is also the case in order to receive messages via a Wi-Fi connection within a building or in citywide areas.

Each user of the mobile device programs his or her username and password into the proprietary messaging application software in order to establish the bidirectional communications session with the server. As will be understood, the username and password provides security and electronic identification for establishing the session.

Preferably, the proprietary messaging application, with username and password available to it, automatically connects with the server to announce its intention to establish a persistent communications session. In the event that the communications link between the server and the mobile device is broken, the server may notify its Administrator. The mobile device may also notify its user. In such a case, the messaging application on the mobile device will continuously attempt to re-establish the communications session. When the communications session has been re-established, the mobile device informs its user of the same. With the communication session having been re-established, the server 20 delivers pending messages that had been accumulated in a queue during the time since the communications session was broken.

In this embodiment, this invention provides a direct permanent, open connection between the centralized PageRouter™ running on server 20, and potentially millions of wireless devices running the TeraMessage™ application (onsite pagers, smartphones, cellular phones and PDAs), via a TCP/IP intelligent network connection. The messaging system is able to support unlimited "Corporate" or "Business" accounts, each with unlimited number of mobile users. Each corporate account provides the ability for the corporation to program their own users, which maintains database confidentiality.

Because the server has a permanent, bi-directional connection with TeraMessage™ applications running in millions of mobile devices, a message can be delivered in a few seconds to any of them, and each message is independent of each other message. This is because the messaging server 21 maintains as many threads as is necessary with respective wireless devices running the TeraMessage™ application.

In this embodiment, the point-to-point bidirectional communications protocol is the TeraMessage™ Protocol (TMP).

Figure 3:
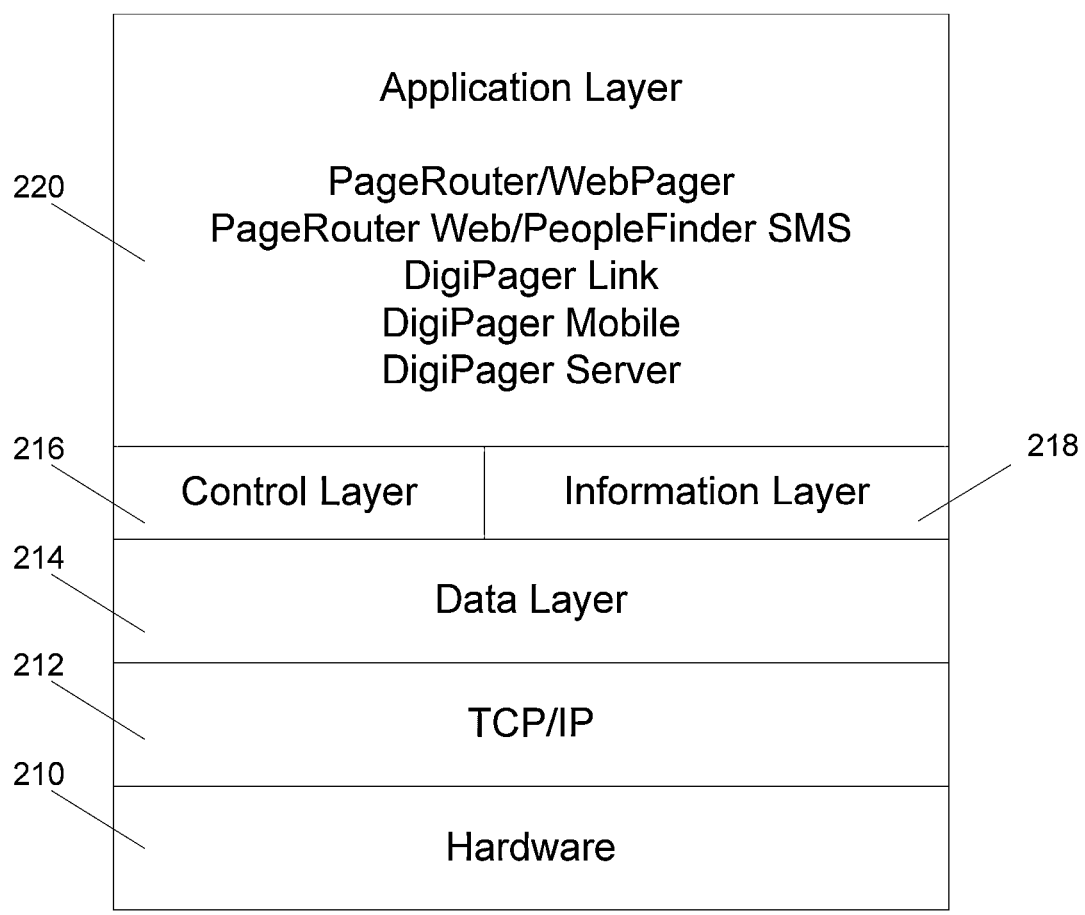
FIG. 3 is a diagram showing the layers of the bidirectional communication protocol according to an embodiment, in conjunction with an application layer and underlying transport layers.

Turning now to FIG. 3, TMP contains three (3) distinct layers atop of the hardware layer 210 and the TCP/IP layer 212, handling bidirectional transmission of data from endpoint to endpoint. The three distinct layers are: the data layer 214, the control layer 216 and the information layer 218. An application layer 220 sits atop the TMP layers.

Data layer blocks are streamed as raw data preferably via TCP/IP intelligent networks end to end to achieve transmission of the message data. Data layer blocks must be received synchronously and completely for the data layer block to be processed by the TeraMessage™ application. The data layer block contains a basic structure that is shown in Table 1, below:

TABLE 1

Data Layer Block

| Fields | Description |
| --- | --- |
| Data Length | The length of data contained within the individual data packet. |
| Compression Flag | For indicating whether the data packet is compressed. |
| Command Flag | For indicating there is a command for the TMP to execute. |
| Data | Variable length block of bytes containing encrypted (and optionally compressed) data to be used in conjunction with the Command Flag, for control of the messaging application. |

The encrypted data packet contained within the data layer of the protocol contains a control layer structure shown in Table 2 below:

TABLE 2

Control Layer Structure

| Fields | Description |
| --- | --- |
| Data Packet ID | A unique identifier for the data packet, which is currently a standard 64 byte guid/uuid (global unique identifier/universal unique identifier) generated for each packet at runtime. |
| Acknowledge Flag | A flag indicating whether the receiver of the data block needs to acknowledge receipt of the data using the data block unique identifier. |
| ResendTimes Flag | A flag indicating how many times the protocol should attempt to resend a message if the receiving end does not acknowledge receipt of the data. |
| ResendDelay Flag | A number indicating the length of time the protocol should wait to receive an acknowledgement of receipt of the data. |

In parallel with the Control layer data, other random well known structured data as defined within the TMP is sent. The Information Layer block is used for transmitting any type of data for use in messaging, data transmission, etc. This is the layer where infinite expansion of the protocol is allowed because it can contain any data to be interpreted by the receiving end of the data transmission.

An example of an information layer structure would be the case of a text message being sent from one TeraMessage enabled application to another using the TMP. The structure might have a string containing the parts of the message, a unique identifier for the message, a string containing the name of the sender, etc. Another example would be the transmission of a large block of data representing an image file. The structure might contain a block of bytes containing the data for the image file and a string indicating the name of the file.

For an application to send data via TMP, it must form an Information Layer packet as defined by the TMP. The Information Layer packet is always derived from the Control Layer packet and as such all of the Control Layer data must be present for the packet to be acceptable for transmission. As an example, to send a text message to a receiver, an Information Layer packet is created containing the fields shown in Table 3 below:

TABLE 3

Exemplary Information Layer Structure

| Fields | Description |
| --- | --- |
| Message ID | A message ID |
| ReplyToSender ID | A reply to sender ID |
| Message Content | The message content |
| Forwarding ID | An optional forwarding ID |
| Sender Name | The name of the sender |
| Attachments Flag | To indicate if there are attachments available. |
| Attachments IDs | A list of IDs for the attachments |
| SenderCanReply Flag | A flag indicating whether the receiver should have the ability to reply to the message; |
| Control Layer Data | See Table 2, above. |

It will be noted that the Attachments IDs reference file attachments stored on the server. These attachments are preferably any kind of file attachment suitable for storage in the server's file system or external to the server such as Adobe™ PDF (Portable Document Format), Microsoft Word™, Excel™, Power Point™ or Visio™, or any JPEG, GIF, or MPEG files, to give a few examples.

Figure 4:
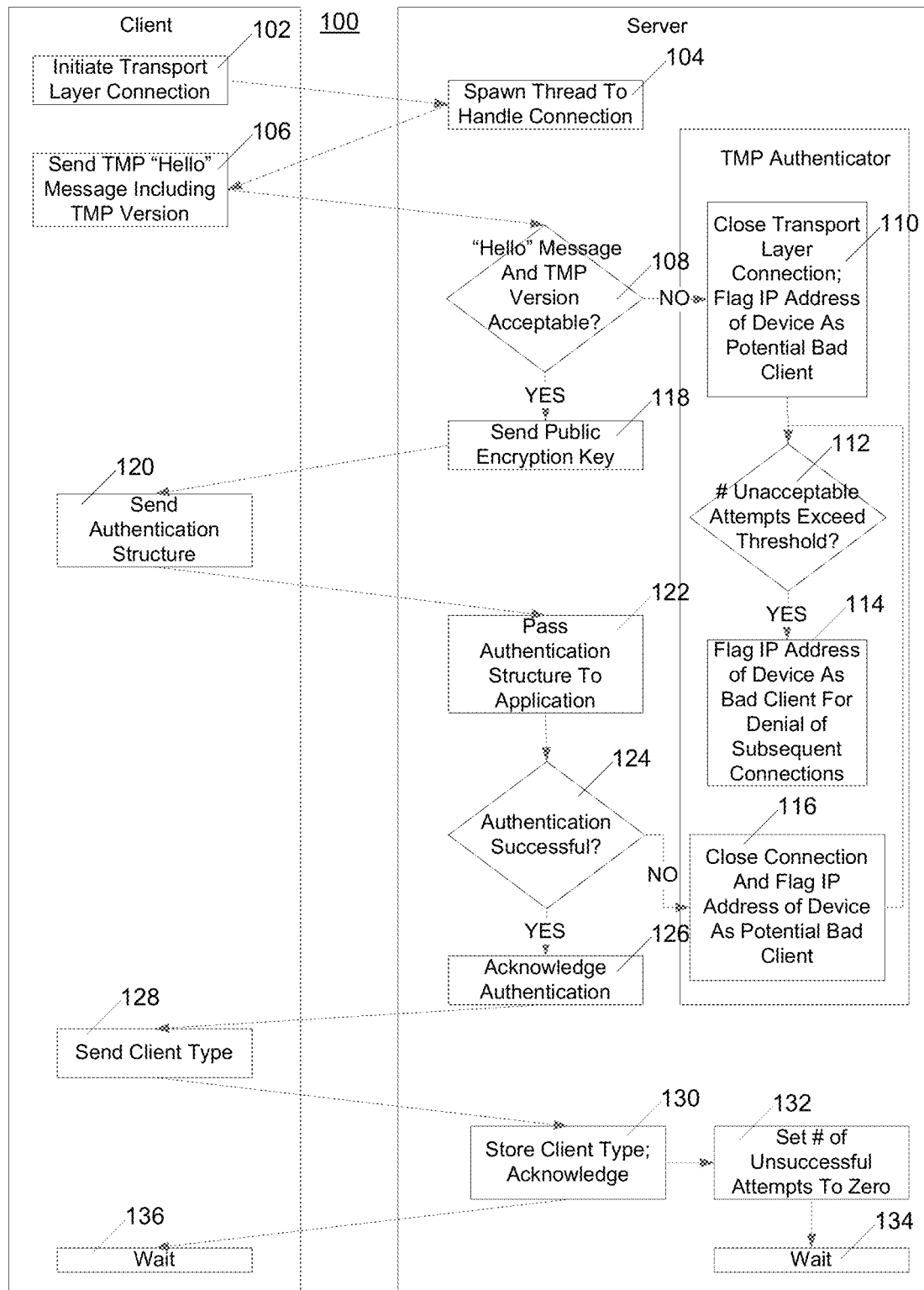
FIG. 4 is a flow diagram showing a handshaking procedure undertaken by a mobile device and the server in order to establish a persistent, bi-directional communications session.

Before data can be sent bi-directionally using the TMP, there is an initial handshake negotiation which takes place between the client mobile device 30 and the server 20. This handshaking negotiation is shown in the flow diagram 100 of FIG. 4, and described below.

Turning now to FIG. 3, the client mobile device 30 first connects to the server 20 using TCP/IP, over any TCP/IP intelligent network, optionally using SSL. As such, the client mobile device 30 establishes a transport layer connection with the server 20 (step 102).

With the TCP/IP connection having been made, a thread is spawned within the server to process the individual client device (step 104). This enables the server to remain available to listen for other incoming connections. As a result, each client-server TCP/IP connection, and accordingly each respective communications session, is handled separately to facilitate multiple connections to the same server from multiple client devices.

After the initial TCP/IP connection, the client device announces itself to the server using a predefined string containing a 'hello' message and the version of the bidirectional protocol that it wishes to use (step 106). The server 20 reads this message and determines based on the structure of the hello message if it is a legitimate, well-formed hello message, and also if the server can support the version of the bidirectional protocol that the client is proposing (step 108). In the event that either of these conditions fails, the server closes the connection.

More particularly, if (at step 110) the server is unable to verify that the client device is a legitimate client device, the IP address of the client device is flagged as a potential bad client via a TMP Authenticator (TMPA) (step 112). After a threshold number of such bad attempts from a particular IP address, as tested at step 114, the IP address is flagged as a bad client and TCP/IP connection attempts from that IP address are thereafter blocked (step 114). This level of security helps to thwart both Denial-of-Service (DOS) and hammer attacks, which as would be understood are attacks that attempt to try an infinite amount of strings to gain access until something works. At every stage of the initial handshake negotiation, the TMPA is used.

In the event that, at step 108, the client device is verified as a legitimate device, server 20 replies to the client device with a randomly generated 'public' encryption key to be used for further communication (step 118). From this point on, any communication between the client device and the server is encrypted using industry standard AES256 encryption based on the public key negotiated between the client device and server. The key is different for every message transaction to provide maximum communication security. As will be understood, alternative encryption protocols may be employed.

Next, the client device sends an information layer packet containing an authentication structure to the server (step 120). On the receiving end, the authentication structure is passed to an application at the application layer (step 122), and the application attempts authentication of the client device. The application at the application layer causes disconnection of the client device and the server, if authentication fails, via the TMPA (step 116). Advantageously, because this level of authentication occurs at the application layer, any application enabled to work atop the TMP protocol is able to authenticate in its own manner. Thus, the application can build upon the authentication built into the protocol itself. Furthermore, at step 116, the TMPA is notified to flag the IP address of the connecting client device as a bad client.

In the event that the authentication has been successful at step 124, the server provides an acknowledgement to the client device that the authentication of the success (step 126). Advantageously, multiple connections from a single client device IP address are enabled in the bidirectional protocol. It is therefore the responsibility of the application at the application layer to track and handle authentication of the one or more client device connections, due to its inherent control over this layer of authentication.

With the authentication having been successful, the client device sends another information layer packet including data indicating its client type (step 128), which is based on the bidirectional protocol-compliant application running at the client device.

At step 130, to complete the handshaking negotiation, the server acknowledges correct receipt of the client type, and stores this information in association with the client device individual connection information (i.e. IP address) for later use by either the protocol or the server application.

With the handshaking having been completed, the bidirectional communications session is established, and any TMPA warnings for the specific IP address of the client device are cleared (step 132) to allow for a reconnection at a later date. At this point, both the client device and the server, in respect of the communications session, are set into a 'waiting' mode so as to be ready to accept data from one another (steps 134 and 136). When either the client device or the server has information to send across the network during the communications session, a well-formed information layer packet must be created and pushed to the protocol. TMP handles moving the data in a few seconds from sender to recipient over the TCP/IP network.

For the purposes of the rest of this document, with the communications session having been established, the terms "client device" and "server" are indefinite because each have the ability to send data at will, and process incoming data accordingly. From here on client and server will refer to the applications that are using TMP, not the TMP endpoints themselves. Sender and receiver will be used to refer to the TeraMessage™ endpoints.

For an application to send data, it must form an Information Layer packet as described above. The Information Layer packet is always derived from the Control Layer packet and as such all of the Control Layer data must be present for the packet to be acceptable for transmission. For example, in order to send a text message to a receiver, an Information Layer packet is created as shown in Table 3, above. The Information Layer packet is then passed to TMP to be sent to the receiver along with a number representing the "command" for the receiver to interpret. Advantageously, the command is sent separately from the Information Layer packet so TMP can process commands that do not need an Information layer packet to be sent in the case of control messages.

Once received, TMP then takes the Information Layer packet and converts it into a binary long object (blob) of data. Depending on the length of the data blob, TMP optionally compresses the data using the standard GZip specification. TMP then takes the data blob and encrypts it using the negotiated encryption key from the initial protocol handshake using the AES-256 algorithm. TMP then creates a Data Layer packet containing the length of the blob, a flag indicating whether the blob is compressed, and the command code. The Data Layer packet is then sent out sequentially via TCP/IP intelligent networks to the receiver.

If more than one Data Layer packet needs to be sent, the multiple Data Layer packets are buffered and sent sequentially. Sequential sending ensures the integrity of each packet. TCP ensures that all fragments of the Data Layer packets are sent and received in order to form the original packet on the receiving end, while TMP ensures that Data Layer packets are sent to TCP sequentially.

If an acknowledgement request is set by the sender application, the sender TMP stores a copy of the Information Layer packet in memory and waits to receive an acknowledgement from the receiver. If no acknowledgement is received before the threshold time is reached, TMP resends the Information packet without any intervention from the sender application. If the number of retries is exceeded without receiving an acknowledgement from the receiver, TMP notifies the sender application so it can take further action.

In order to receive a message, the receiver gets the Data Layer packet and parses the data according to the TMP Data Layer specification set out in Table 1, above. The length of the blob data, the compression flag, and the command code are extracted. If any of these pieces of data are deemed by the receiving end to be incorrect in format or content, it will ignore the data and wait for further data to be sent (or in the case of bad data to be hopefully resent). Alternatively, the receiver will completely disconnect at the transport layer connection level, depending upon on settings specified by the receiver application.

If disconnection is initiated by the client, the client may subsequently reconnect to the server automatically based on settings in the application. If disconnection is initiated by the server, the server takes take no further action to re-connect. It is therefore up to the client application to reconnect to the server in the event of a disconnection.

If the extracted data is correct and complete, the protocol does the reverse of the sending end. That is, the data blob is extracted from the Data Layer based on the data length in the header. The blob is decrypted and optionally decompressed based on compression flag. The result is the Information Layer packet as originally sent by the sender application. The command code and Information Layer packet are then processed and dispatched to the application.

In the case that an acknowledgement is requested, the TMP automatically sends back an acknowledgement Information Layer packet over the same communications session connection to the original sender. TMP on the original sender then releases the Information Layer packet from memory.

Figure 5:
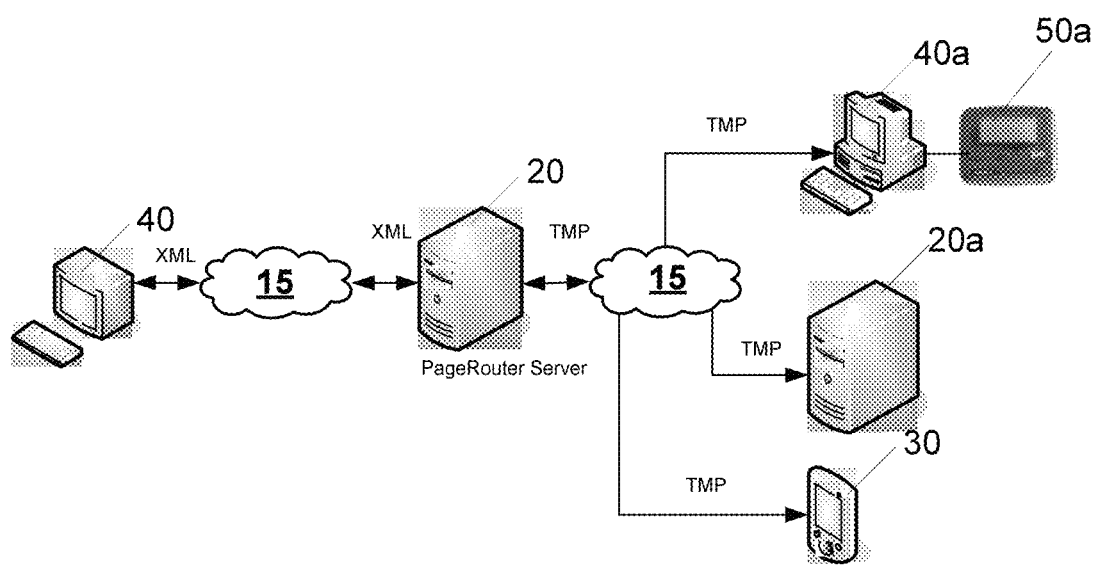
FIG. 5 is a schematic diagram showing the flow of messages from a personal computer in the communications network, according to an embodiment.

Message flow between devices will now be described. FIG. 5 is a schematic diagram showing the flow of message data from a network-connected computer 40 during messaging. In order to send a message from a network-connected computer 40, a user first opens a Web browser on the computer 40 that has established a connection with an Internet (or Intranet) service provider, and navigates to a login page hosted by the server 20. The user enters a username and protective password at the login page to gain access to the messaging application.

With access having been gained, the user navigates to a message compose page and selects one or more recipients from a preprogrammed list of recipients to which the user has access. The preprogrammed list may be organized by Group, Department, and so forth. The user enters the text of his/her message, selects attachments from the local file system using a Browse button, and clicks the SEND button. As shown in FIG. 5, the message originating at the network-connected computer 40, along with any attachments, is submitted from the computer 40 to the server 20, using the XML protocol.

The server receives the message in XML format, and accordingly sends it to the programmed destination via the TCP/IP intelligent network 15 using TMP.

More particularly, the message is received by the server 20 and placed in a processing queue. The server then verifies that the Username and ID of the sender against the User database to ensure validity. The server also checks if the message has files attachments delivered with the message, stores any attachments in an attachment database, and creates a list of the name of the attached files and their location in the attachment database.

Messages in the processing queue are processed for transmission to destinations according to information that has been pre-programmed into the User record in the User Database by an administrator. FIG. 6 is an example screenshot of a PageRouter™ administrator screen for programming the User record for user "April Brown". It can be seen that April Brown's User record specifies that messages to April Brown will go both to her onsite pager and to her mobile (cellular) telephone.

The PageRouter™ server 20 identifies each recipient, group and department using a Short ID. The server 20 creates an identical message for each individual recipient in a Group or in a Department that is specified in the received message. The server 20 then distributes the message to each recipient, along with a list of the attachments and their location. In the example of April Brown as shown in FIG. 6, a message having the short ID of "101" will be sent to an onsite pager and to April Brown's mobile device (cell phone) 30 that has already established its persistent bi-directional communications session with the server 20. The administrator's screen shown in FIG. 6 also includes the Username and Password that must have been submitted by April Brown's mobile device 30 in order to establish the persistent, bi-directional communications session.

Figure 7:
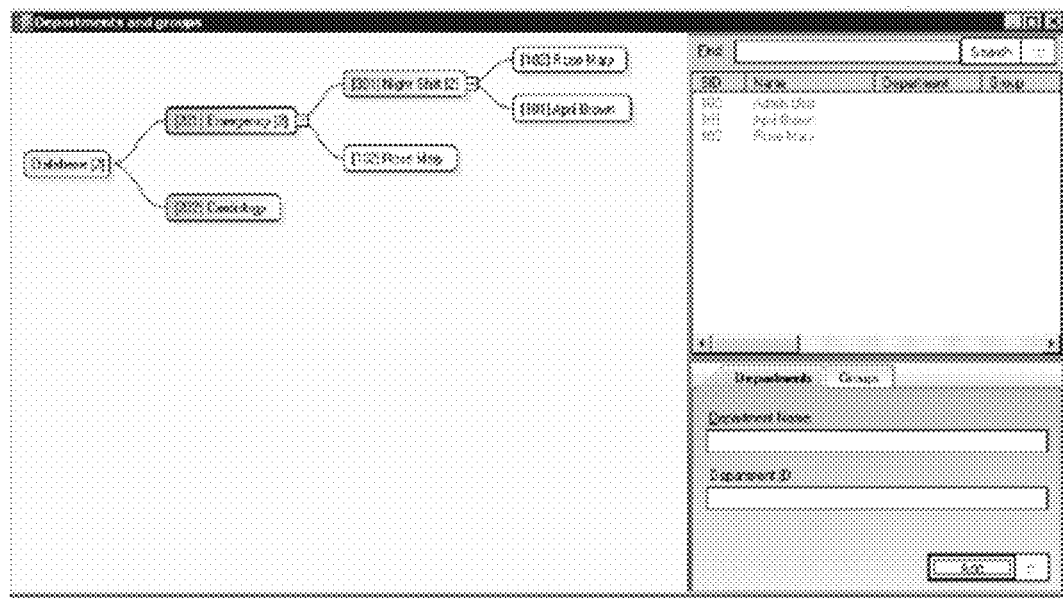
FIG. 7 is a screenshot showing a second screen of an administrator's interface to the server.

FIG. 7 is an example screenshot of another PageRouter™ administrator screen enabling an administrator to create Groups and Departments, and to associate users with each. Names of users listed in the top right corner of the screen/window may be selected and dragged into Groups and/or Departments whose interrelationships are mapped out dynamically on the left side of the screen/window. New Groups and Departments are created using the form in the bottom right corner of the screen/window, and given their own respective Group Short ID or Department Short ID. The interrelationships mapped out on the left side of the screen/window represent how the administrator has arranged for a message having a particular Group Short ID or Department Short ID to be delivered to one or more individual recipients. For example, according to FIG. 7, the administrator has twice dragged Rose Mary's name from the list in the top right corner of the screen/window into the left side of the screen/window and associated it with both the Emergency Group 201 and the Night Shift Department 301. This visual arrangement of interrelationships greatly simplifies the administrator's job of configuring and reconfiguring the relationships, when compared with prior art methods of producing confusing listings of assignments. Once this has been done by an administrator, as can be seen in FIG. 7, PageRouter™ has automatically been configured to provide a message sent to Group 301 Night Shift to user Rose Mary's onsite pager, and also to April Brown's onsite pager and cellular telephone.

Each message in queue may have a list of attachments that is sent to each recipient mobile device. The user of the recipient mobile device can thereby see the list of attachments and accordingly initiate the download of the attached files as desired.

Advantageously, in the case that the message destination is a mobile device 30, there is already generally a persistent bidirectional communications session established between the server 20 and the mobile device 30, if the mobile device is up and running. As such, prior to sending out the message from the processing queue, the server 20 simply verifies that the corresponding communications session with mobile device 30 still exists.

Next, each message is sent to corresponding destinations. Multiple messages are sent to the various destinations simultaneously, and mobile devices running the TeraMessage™ application will receive their respective message(s) in a few seconds.

It will be noted that the selected network port at which the client device messaging application is listening may be changed if needed. For example, the messaging application on a mobile device 30 may create a transport layer connection with the server 20 via ports typically used for other kinds of data traveling through the firewall to other existing cellular telephone applications.

The recipient may be preprogrammed as carrying a mobile device that is a pager 50a. DigiPager Link™ clients 40a are used to send messages to onsite pagers 50a at remote locations, as has been described generally above. More particularly, if the recipient is programmed as carrying an onsite pager 50a, PageRouter™ will deliver the message to a local Canamex Communications encoder transmitter for transmission in the building. However, if the user with an onsite pager is located at a remote location, a DigiPager Link™ client application 40a installed at the remote location computer 40 is used to send messages to the onsite pagers 50a at the remote location using a Canamex Communications encoder transmitter. The messages are provided to the DigiPager Link™ client application 40a via its persistent, bi-directional communications session established with the PageRouter™ server 21. The computer 40 delivers messages to the paging encoder transmitter for delivering the messages, in turn, to onsite pagers 50a.

For example, should a hospital located in Toronto and having a PageRouter™ server 20 installed at the hospital wish to send messages to Nurses at their nursing home in another city, DigiPager Link™ client application 40a is installed on a computer 40 that is at, or associated with, the nursing home in the other city. The installed DigiPager Link™ client application 40a on the computer 40 in the other city is operationally connected to a local area paging encoder transmitter (such as Canamex's DigiPager Wireless™) in order to enable onsite transmission of pager messages to the pagers the Nurses carry. The installed DigiPager Link™ software is also operationally connected to the PageRouter™ server 20 in Toronto via the Internet (TCP/IP intelligent network), and communications between the two is done using the TMP, as discussed above.

As will be understood, in some applications, a corporate user may prefer to use onsite pagers instead of another type of mobile device such as a PDA or cellular telephone. For example, workers in a factory often prefer one-way pagers because they vibrate harder and are less expensive than a PDA.

Figure 8:
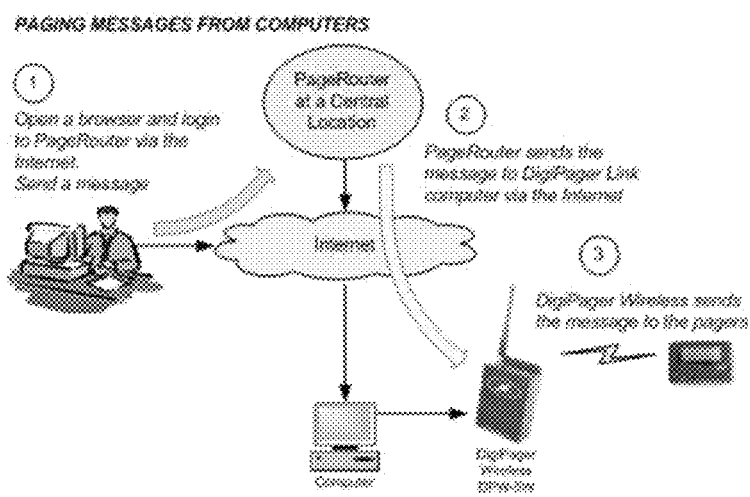
FIG. 8 is a schematic/flow diagram showing the flow of messages from a personal computer to a pager, according to an embodiment.

To support this functionality, as shown in FIG. 8, the DigiPager Link™ client application may be installed in a network computer 40 connected to the TCP/IP intelligent network 15 for a direct connection to the PageRouter™ server 20. A DigiPager Wireless™ paging encoder transmitter is then connected to the same network computer 40. The user accesses his/her account by logging onto the server 20 using a browser connected to the TCP/IP intelligent network 15, and the server 20 delivers the message to the DigiPager Link™ messaging application running on the network computer 40 via the connection. The DigiPager Link™ messaging application in turn then delivers the messages to the local DigiPager Wireless™ paging encoder for transmission over the air to onsite pagers. With this option, a copy of the message sent to the DigiPager Link™ remote messaging application on the network computer 40 for paging is retained in the server 20. The moment that the Paging encoder sends the message over the air, a sentinel paging monitor receiver unit (such as that shown and described in U.S. Pat. No. 7,019,616 issued to Jorge Fernandez on Mar. 28, 2006, the contents of which are incorporated herein by reference in their entirety) connected to the network computer 40 receives the message and returns it back to the server 20, logging a confirmation that the message was actually transmitted over the air at the remote site. When using the sentinel monitor receiving unit, if PageRouter™ does not receive the message that was received over-the-air by the sentinel, PageRouter™ will send the same message to the DigiPager Link™ application using TMP for re-transmission a programmed number of times. PageRouter™ will notify the account manager that a message was not transmitted if PageRouter™ does not receive message transmission confirmation after the programmable number of attempts.

Figure 9:
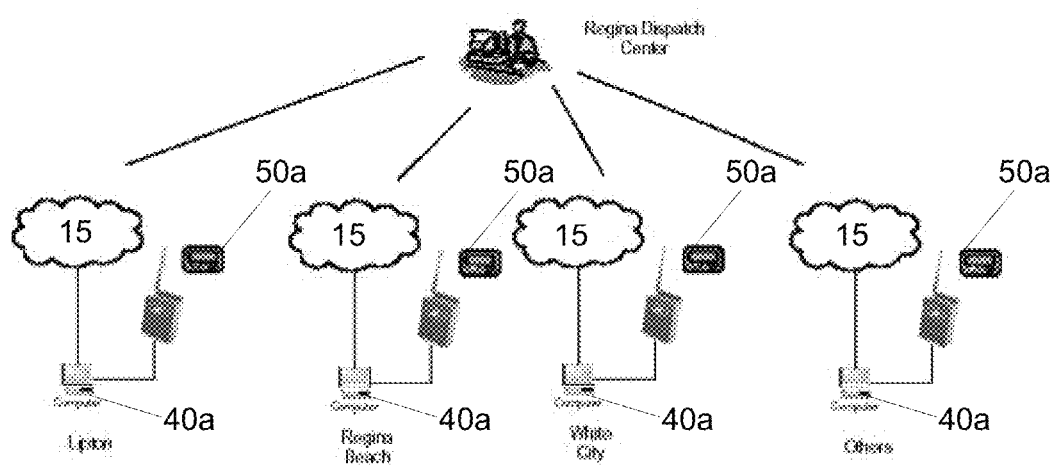
FIG. 9 is a schematic diagram showing a system of message links useful for an emergency notification network to page messages at remote sites, according to an embodiment.

A configuration based on this approach that may be employed by a public emergency service such as the "911" service is shown in FIG. 9. In this configuration, a dispatch center accesses the PageRouter™ server in order to send an emergency message over the Internet to pagers via computers 40 in local pager networks in various regions (such as Lipton, Regina Beach etc.). The sentinel (not shown in FIG. 9 for simplicity) is connected to each of the remote computers 40 to confirm that the message(s) have been transmitted over the air at each site.

Figure 10:
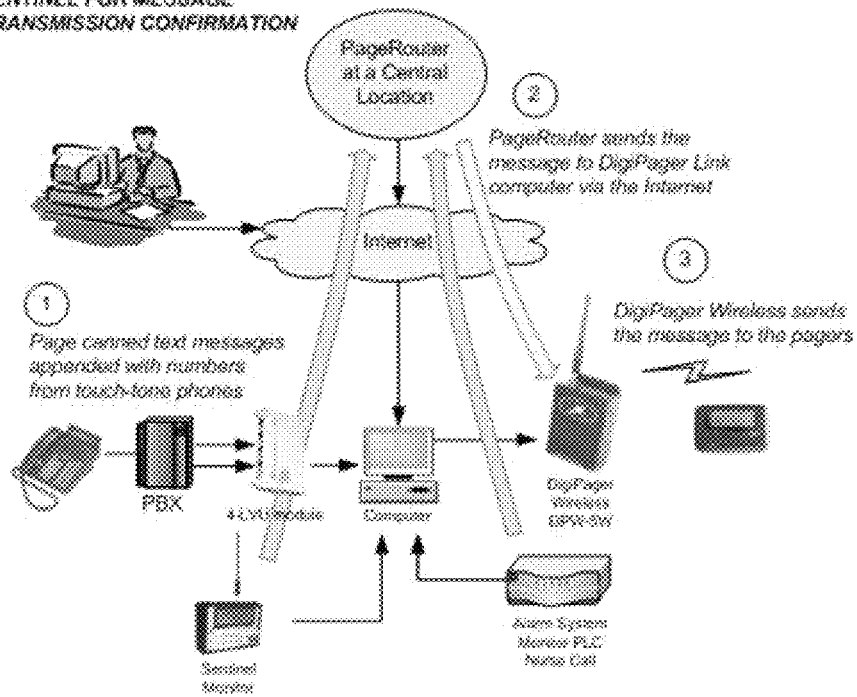
FIG. 10 is a schematic/flow diagram showing the flow of messages from a telephone to a pager, according to an embodiment.

In other instances, the users at a remote location may want to send messages to local onsite pagers using a touch-tone phone. The network may therefore be configured as illustrated in FIG. 10. According to this configuration, staff using a telephone can call a local PBX extension interfaced with a 4-LVU unit which is in turn connected to the network-connected computer 40 running DigiPager Link™. Voice prompts guide the calling staff to enter a pager ID and a numeric message. Optionally, a user can trigger a canned, or preconfigured, text message using the telephone touch-tones, such as "Please Call Me" or "Fire in the Warehouse". The message from the 4-LVU is delivered to the DigiPager Link™ software running on the network connected computer 40. The message is then sent to PageRouter™ server 20 for processing. The PageRouter™ server returns the message to the DigiPager Link™ application, which is then sent to the encoder paging transmitter. Ultimately, the message is delivered to the pager seconds after the calling staff hangs up the telephone. As shown, an alarm system to monitor local alarm status and/or a sentinel may be used to provide alarm monitoring and confirmation of over-the-air transmission of messages.

Messages can be sent from one server 20 running the PageRouter™ messaging application to one or more other servers 20 (not shown) that also each run the messaging application, in order to distribute messages more widely. One example of the utility of such a configuration would be that of three (3) dams along a waterway, that are each separated by hundreds of miles. Each dam might have an operational crew of 50 people, each of whom carries a pager. Each of the dams will operate its own paging system, but it would be advantageous for each paging system to also be able to communicate with the others so that both emergency and routine messages may be sent quickly, efficiently, and securely between dam sites.

In order to accommodate these needs, each site may be provided with its own entirely autonomous PageRouter™ server, each of which monitors alarms and provides paging from network connected computers. In addition, however, each of the PageRouter™ servers send messages between one another using the TMP, so that emergency messages can be delivered to all people in the case of emergency. In other words, each of the PageRouter™ servers 20 in this case maintains persistent, bidirectional communications sessions with each other. Messages and attachments can quickly flow from one to another according to User, Group and Department profiles and interrelationships as described above. For example, an emergency message for April Brown could be sent to the local onsite transmitter at her dam, to her cell phone, and also to the two remote dams for onsite paging where cellular service does not have coverage.

Figure 11:
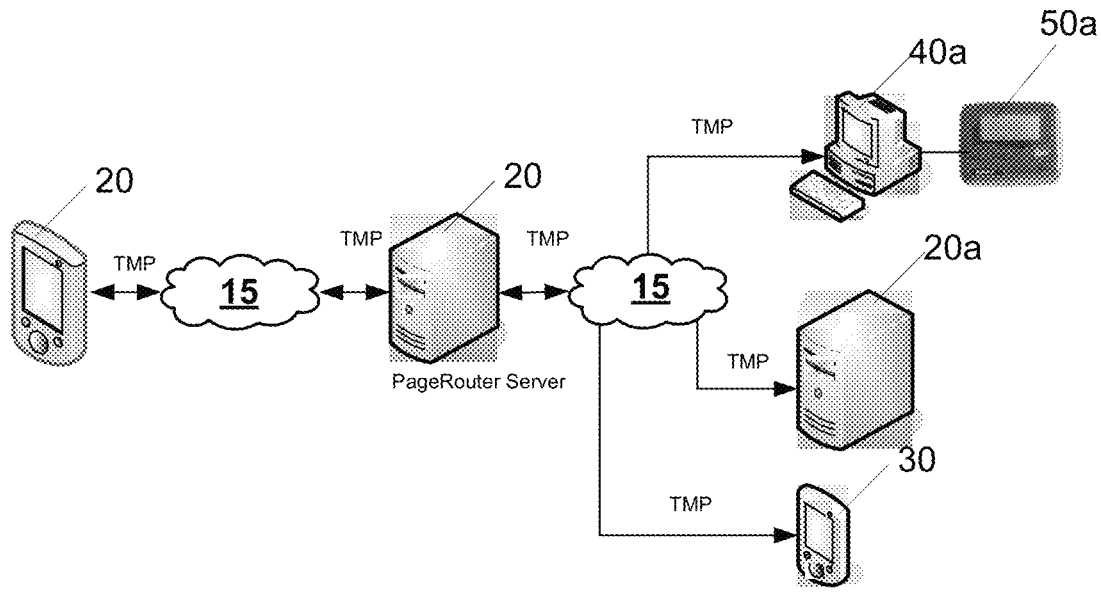
FIG. 11 is a schematic/flow diagram showing the flow of messages from a mobile device in the communications network, according to an embodiment.

FIG. 11 is a schematic diagram showing the flow of message data from a mobile device 30 during messaging. In order to send a message from a mobile device 30, the mobile device user selects a name from a Name Directory that is normally transferred from PageRouter™ when the mobile device 30 has been turned on, when the TeraMessage™ application is first installed on the mobile device 30, or at the time the mobile device 30 is reconnected with the PageRouter™ server.

Advantageously, the PageRouter™ server 20 automatically sends an updated or new user database to the TeraMessage™ application on the mobile device 30 if there have been any changes to it. Advantageously, the server 20 can decide to upgrade the entire database, or only those records that have been changed or are applicable to the user of the mobile device 30. For example, if company ABC has fifty mobile device users and the Administrator adds one more user and makes changes in another 4 User records, the server 20 may update all fifty mobile devices 30 with an entirely new Name Directory. As another example, if company XYZ has five Departments and the Administrator has changed the ID of one individual belonging to the "Sales" Department, the server 20 may choose to provide an upgrade of the name Directory for the TeraMessage™ application on the mobile devices 30 of only the people in the Sales Department.

The Name Directory consists of names and Short IDs of individuals, Groups and Departments for a particular organization only. The name directory is associated either directly or indirectly with the customer account number.

Sending a message from a mobile device 30 does not involve navigation with a Web browser, and entry of a user name and password, because due to the handshaking described above, the mobile device has established a persistent bidirectional communication session with the server via the Internet or the Intranet using the bidirectional messaging protocol. As such, the user of the mobile device simply selects a recipient from a list of names in the mobile device's Name Directory on a message composition form that is displayed on the mobile device, enters the text of message and presses SEND. The server thread in waiting mode receives and processes the sent message to identify the recipient and determine the corresponding destination device, and sends the message to the determined destination device via the Internet or the Intranet.

Where a mobile device user desires to send a message to other mobile device users, the mobile device user composes a text message and chooses a recipient, as described above. Advantageously, a mobile device user can also enter the username corresponding to another mobile device, even if the name does not appear in the Name Directory. Thus, mobile device users of the messaging service can send messages to any other mobile users of the service.

The messaging application running on the mobile device delivers the message to the server according to the protocol. The server checks the message and places it in queue for processing. After confirmation as described above, the server then sends the message to the destination mobile user.

Optionally, the sender can select one or multiple files to be sent as attachments with the text of the message. In such a case, the messaging application uploads the attachments to the attachments database on the server, so that a recipient of the text message can download the attachments when desired.

Attachments are moved with a message from the sending mobile device to the attachment database on the server. Attachments can be sent to mobile users from computers or from other mobile devices. For example, a mobile device user can send a message including a photograph attachment. When the user sends the message, the messaging application on the mobile device uses the protocol to send the text of the message and at the same time, to upload the attachment to the attachments database on the server. The message and the attachments are processed by sending the text of the messages and the attachment list to the destination mobile device user.

A mobile device user receives a message that consists of the text of the message and a list of files attached to the message. The user can read the text of the message and see a list with the name of the files attached to the message. The attachments are not, however, sent to the wireless device with the text of the message. Rather, the server sends only the list of the files attached to the message, and the attachments remain in the server for download to the mobile device as desired by the recipient.

After receiving a message with a list of multiple attachments, the user can click to download each attachment at a time. The messaging application on the mobile device will then prompt the user to identify in which folder the file should be saved. The messaging application on the mobile device then starts receiving the data file from the server via the communications session.

When messages are transmitted, the message information is flagged to appear in a message log. The log contains the message details such as date and time of transmission and reception, the sender, the recipient, the phone number of the recipient, if the message was "read" and if the attachments were "viewed", the calculation of the time that the message took to get to the recipient wireless device and other relevant information.

The log also shows the status of each message, as shown in Table 4 below:

TABLE 4

| Message Log Status | |
|---|---|
| Status | Description |
| Not Sent | The message never left the server |
| Delivered | The message was delivered to the mobile device messaging application only, but has not been displayed for "reading". |
| Sent | The message is in the wireless device ready to be "read". |
| Read | The text message has been "read" by the recipient. |
| Viewed | The attachment was "viewed" by the recipient. |

When using a sentinel paging monitor receiver, the log posts the status "transmitted" and shows the time that the message took to be received by the onsite pagers.

A mobile user may also have access to PageRouter™ using the WebPager™ application to send messages. The WebPager™ application also allows the user to view the log via a network-connected computer of his/her messages received in the wireless device from other users with mobile device or from other computers and message sources. The user can view the log of messages sent to him/her by other people in the company, nurse call systems, monitor systems and from other people using WebPager™ including attachments. Using WebPager™, the user can also see the log of messages sent by him/her from WebPager™ or from his/her mobile device. The user can view in the computer the attached files sent to his/her wireless device from other wireless devices or computers. Users cannot delete or change messages or attachments stored in the log.

To view a sent or received attachment in the WebPager™ message log, the user clicks on the attachment icon of a message in the log list. The user can display messages sent or received in the past filtered by a date range, text of message, sender or recipient.

The user can double-click to call up for the correct application to view the attached file. i.e.: The Adobe reader will open to present the viewer the attached Adobe file.

The above described messaging system and methods are useful in a business context. For example, a corporation may contract the service only for their employees. For facilitating ease of implementation, the company's administrator may simply be required to access a particular website (for example, www.teramessage.com) to subscribe to the messaging system, obtain a customer number, and begin setting up login rights. As such, the Administrator is able to specify who in the organization has the rights to send and receive messages. Certain people may be configured to only receive messages on their mobile devices 30, whereas others may be able to both send and receive, and still others may be associated with a non-mobile device and able to send and receive messages using that non-mobile device. The service is run using a hosting model whereby a PageRouter™ server is run by the host. The corporate subscriber is able to download the TeraMessage™ application for installation on their mobile device and/or the DigiPager Link™ is downloaded for installation in one of their computers 40 to connect to a DigiPager Wireless™ paging encoder transmitter for onsite paging.

Advantageously, a company may have more than one Administrator and unlimited users. The Administrator can organize users by Departments and create unlimited Groups with unlimited members in each group. The Administrator is also able to access the master message log in the PageRouter™ server 21 to filter and analyze sent message and attachments information. The logs may be printed or exported in Microsoft Excel™, plain text, or Adobe™ formats, to name just a few examples.

According to an embodiment, the Administrator buy "buckets" or sets of messages for a specified fee, by accessing the TeraMessage™ web site. Collection of fees is done by credit cards in an electronic shopping cart fashion.

Transmission of files attached to a message may be charged at a set equivalent number of messages based on its size in Kilobytes, and removed from the purchased message bucket.

The messaging system described herein may be configured to send an email notification to the Administrator when the number of messages in the bucket declines to a threshold level. Advantageously, the user can set the minimum amount of messages for notification.

Advantageously, the company's administrator, through an administrative TeraMessage™ service interface, has access to every message that is sent through the system to and from each employee. The log accessible by the administrator shows the message sender, the message recipient(s), the list of the attachments for each message, and the message text. With the system disclosed herein, TeraMessage™ service provides a high degree of information protection and accessibility to a company. Because each message is encrypted and optionally compressed at the protocol level, the messaging system described herein presents great difficulties for hackers and spammers to launch attacks or decipher a message.

As an alternative to subscribing to a hosted TeraMessage™ service, a customer may wish to have a local service installed in its own server. For example, a bank may wish to install the TeraMessage™ service in their server to provide encrypted instant messaging between their employees. As another example, a Hospital may wish to install the TeraMessage™ service in their server 20 to provide messaging between Hospital staff from computers to mobile phones. In such situations, a PageRouter™ server application is provided for installation and running on an independent server at the customer location and connected to their private LAN or the Internet. The customer is required to pay for the equipment plus a usage license fee per year including product support and service. The PageRouter™ application provides the customer with different message destinations. Other configurations of service provision may be envisioned that fall within the purpose and scope of the invention described herein.

The method and system described above for establishing a bi-directional communications session and for messaging may be embodied in one or more software applications comprising computer executable instructions executed by the server and other devices. The software application(s) may comprise program modules including routines, programs, object components, data structures etc. and may be embodied as computer readable program code stored on a computer readable medium. The computer readable medium is any data storage device that can store data, which can thereafter be read by a computing device. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that variations and modifications may be made without departing from the purpose and scope thereof as defined by the appended claims.

What is claimed is:

1. A private messaging server configured to facilitate transmitting messages between users, the private messaging server comprising:
   a user database configured to store:
      user information for the users; and
      at least one name directory configured by an administrator, the name directory including a list of users permitted to communicate with each other;
   a processor; and
   memory having stored thereon instructions which when executed by the processor cause the private messaging server to:
      establish a persistent bidirectional communication session with the users on corresponding devices;
      transmit the name directory to the users when:
         the persistent bidirectional communication session has been established; and
         the list of users permitted to communicate with each other has been modified by the administrator;
      receive a message from a first one of the users to transmit to a second one of the users; and
      verify that the second one of the users is included in the name directory before transmitting the message;
   wherein the name directory is to be used by the users for selecting one or more recipients from the list when creating the messages;
   wherein messages between the users are transmitted via the private messaging server.

2. The private messaging server of claim 1, wherein the memory further comprises instructions that cause the private messaging server to receive a request from the users on the corresponding devices to access the private messaging server; validate the users in accordance with the stored user information; establish the persistent bidirectional communication session; and transmit the name directory to the users upon validation.

3. The private messaging server of claim 1, wherein the name directory is transmitted to all the users listed in the name directory when the name directory has been modified by the administrator.

4. The private messaging server of claim 1, wherein the memory further comprises instructions that cause the private messaging server to:

determine at least one recipient device associated with the second one of the users; and transmit the message to the at least one recipient device.

5. The private messaging server of claim 1 wherein the name directory comprises user identifiers identifying individual ones of the users.

6. The private messaging server of claim 5 wherein the name directory further comprises group identifiers identifying groups of the users.

7. The private messaging server of claim 4 wherein the memory further comprises instructions that cause the messaging server to encrypt the message.

8. The private messaging server of claim 4 wherein the memory further comprises instructions that cause the messaging server to compress the message.

9. The private messaging server of claim 4 wherein the memory further comprises instructions that cause the private messaging server to process the message to determine whether the at least one recipient device is required to acknowledge receipt of the message.

10. The private messaging server of claim 9 wherein the memory further comprises instructions that cause the messaging server to re-send the message in the event that receipt of the message is not acknowledged within a threshold time period.

11. The private messaging server of claim 4 wherein when one of the messages includes at least one attachment, the private messaging server:

receives the message including the attachment;

stores the attachment;

replaces the attachment in the message with a representation of the attachment; and transmits the message including the representation of the attachment.

12. The private messaging server of claim 9 wherein the memory further comprises instructions that cause the private messaging server communicate to the first one of the users that the message has been read at the at least one recipient device.

13. The private messaging server of claim 9 wherein the memory further comprises instructions that cause the private messaging server to automatically send the message to an alternative recipient if the message is not read at the at least one recipient device within a predetermined time.

14. The private messaging server of claim 12 wherein the memory further comprises instructions that cause the private messaging server to communicate to the first one of the users a date and time that the message was read at the at least one recipient device.

15. The private messaging server of claim 11 wherein the memory further comprises instructions that cause the private messaging server to communicate to the first one of the users that at least one attachment has been read at the at least one recipient device.

16. The private messaging server of claim 15 wherein the memory further comprises instructions that cause the private messaging server to communicate to the first one of the users a date and time that the at least one attachment has been viewed at the at least one recipient device.

17. The private messaging server of claim 1 the user database further configured to store a log including message details for each of the messages.

18. The private messaging server of claim 17 wherein the message details includes at least one of a date of transmission, a time of transmission, a date of reception, a time of reception, the first one of the users, the second one of the users, an indication of whether the message was read, an indication of whether the attachments were viewed, or the calculation of the time that the message took to get to the at least one recipient device.

19. The private messaging server of claim 2, wherein validating the users comprises, for each user:

verifying that the corresponding device is a legitimate client device; and providing the corresponding device with a random, unique public encryption key specific to the session for use in encrypting the message.

20. The private messaging server of claim 19, wherein validating the users further comprises, for each user:

receiving an information layer packet containing an authentication structure encrypted using the public encryption key;

authenticate the information layer packet;

provide an acknowledgement of the validation to the user; and stores this information in association with the client device individual connection information.

21. The private messaging server of claim 19, wherein the public encryption key is used to decrypt message at a protocol level.

22. The private messaging server of claim 19, wherein verifying that the corresponding device is a legitimate client device comprises:

receiving an announcement message from the corresponding device, the announcement message comprising a message string and a version of a protocol for establishing the bi-directional communication session;

comparing the message string with a predefined string to validate the client device; and comparing the version of the protocol to determine if the bi-directional communication session can be supported.

* * * * *